UNITED STATES PATENT OFFICE.

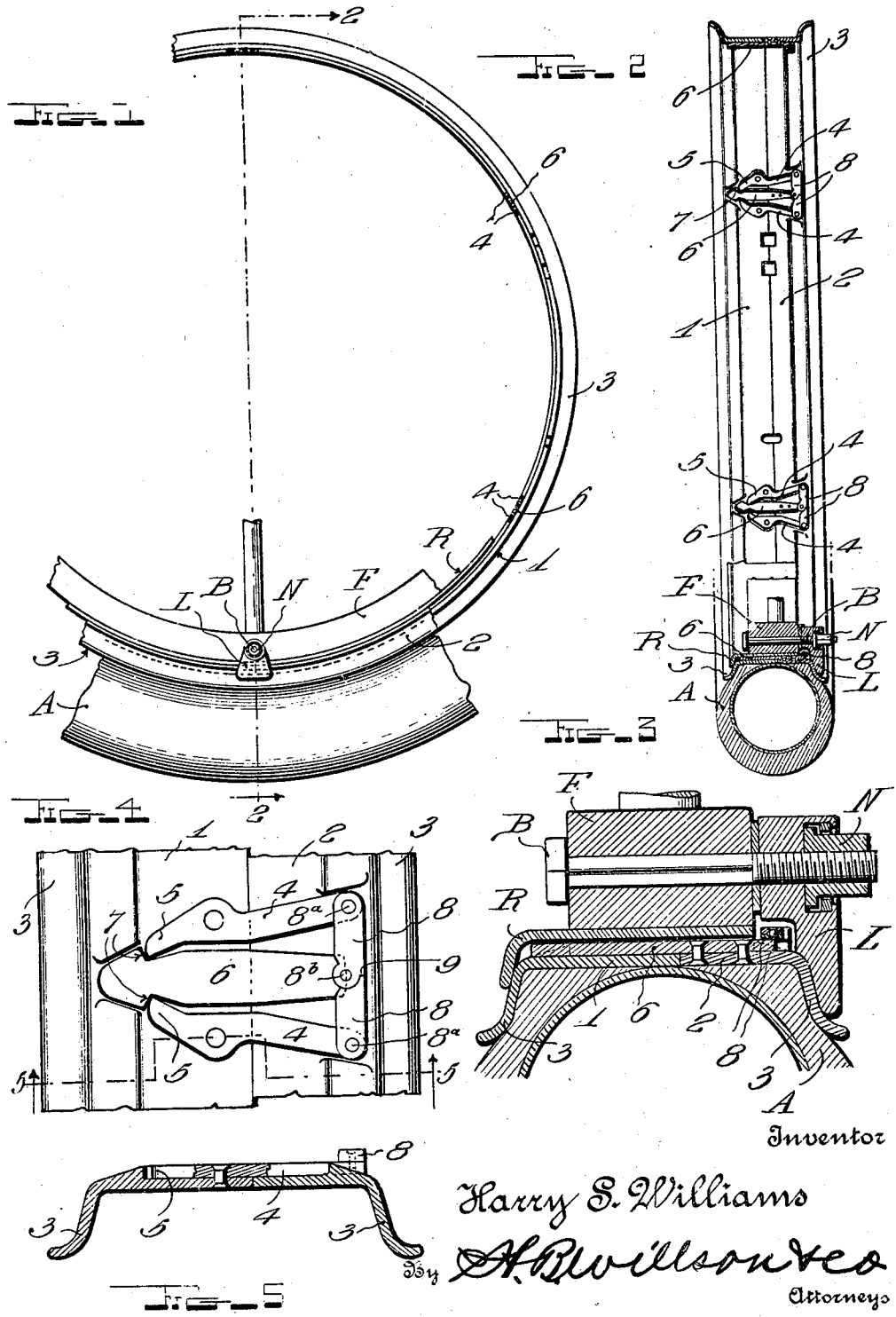

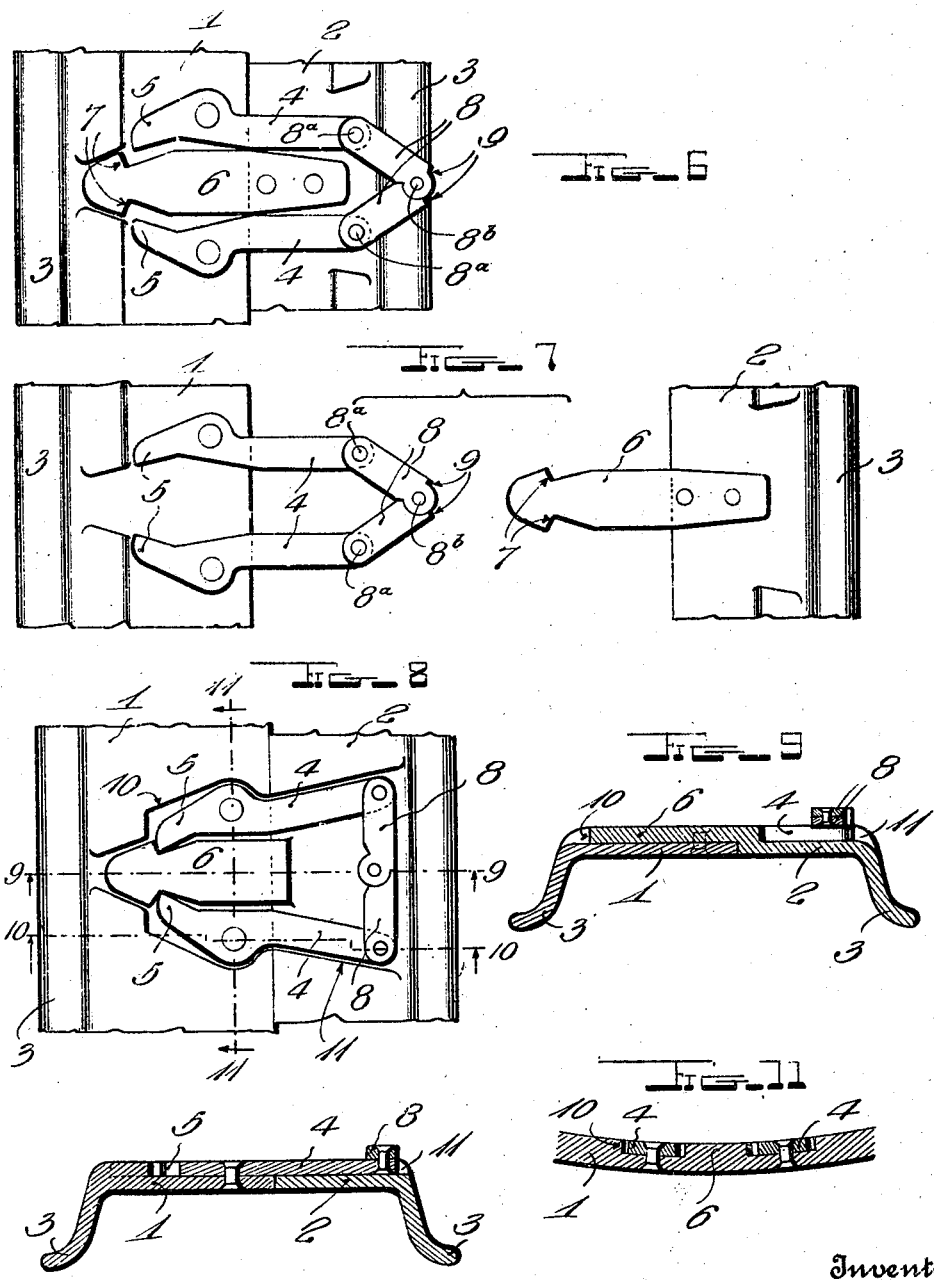

HARRY S. WILLIAMS, OF SAN ANTONIO, TEXAS, ASSIGNOR OF ONE-HALF TO OTTO KELLER, OF SAN ANTONIO, TEXAS.

SECTIONAL RIM.

1,379,888.  Specification of Letters Patent.  Patented May 31, 1921.

Application filed January 19, 1920. Serial No. 352,472.

*To all whom it may concern:*

Be it known that I, HARRY S. WILLIAMS, a citizen of the United States, residing at San Antonio, in the county of Bexar and State of Texas, have invented certain new and useful Improvements in Sectional Rims; and I do declare the following to be a full, clear, and exact description of the invention, such as will enable others skilled in the art to which it appertains to make and use the same.

This invention relates generally to tire rims, and more particularly to sectional demountable tire rims.

The principal object of the invention is to provide a sectional demountable tire rim with interlocking means which can be readily and easily actuated and the rim sections separated so as to remove a tire from or apply one to the rim with the hands and without the use of tools.

Another object of the invention is to provide a sectional demountable tire rim with interlocking means which cannot become unlocked under the lateral pressure of the tire upon the rim sections.

A further object of the invention is to provide a sectional demountable tire rim with interlocking means having portions engageable with and held in locked position by portions of the means which clamps the rim upon the felly of a wheel.

A still further object of the invention is to generally improve upon rims of this character by the provision of a comparatively simple, strong, durable and inexpensive construction, one which will be efficient and reliable in operation, and well adapted to the purpose for which it is designed.

With these and other objects in view, the invention consists of the novel features of construction, and the combination and arrangement of parts as will be hereinafter fully described and claimed.

In the accompanying drawings:—

Figure 1 is a side elevation, partly in section, of a portion of a wheel provided with a rim constructed in accordance with this invention.

Fig. 2 is a vertical transverse sectional view of the wheel taken substantially on the line 2—2 of Fig. 1.

Fig. 3 is an enlarged transverse sectional view across the felly of the wheel.

Fig. 4 is a plan view of the inner side of a portion of the rim, showing particularly the coacting locking members in locked position.

Fig. 5 is a transverse sectional view of the rim taken substantially on the line 5—5 of Fig. 4.

Fig. 6 is a plan view similar to Fig. 4, the locking members carried by one of the rim sections being shown in unlocked position.

Fig. 7 is a view similar to Figs. 4 and 6 showing the two rim sections separated.

Fig. 8 is a view similar to Fig. 4 illustrating a modified form of the invention.

Figs. 9 and 10 are transverse sectional views taken substantially on the lines 9—9 and 10—10 of Fig. 8.

Fig. 11 is a longitudinal sectional view taken substantially on the line 11—11 of Fig. 8.

In the drawings above briefly described a pair of circular complementary rim sections 1 and 2 are shown. These sections 1 and 2 are provided at their outer edges with outwardly extending flanges 3 adapted to bear against the sides of a tire A as shown when said sections are brought together in abutting relation.

The section 1 has pivoted thereto on its inner side and intermediate their ends a number of pairs of spaced levers 4, the latter extending transversely of the section and having one of their ends projecting a considerable distance beyond the inner edge of the same. The other ends of the levers 4 are provided with noses 5 engageable with the coacting locking members carried by the section 2.

The section 2 carries a number of locking members in the form of laterally extending shouldered lugs 6, the latter projecting beyond the inner edge of the section 2. The shoulders 7 of the lugs 6 are preferably formed by forming notches in the opposite edges of the same. The lugs 6 are insertible between the pairs of spaced levers 4 when the rim sections are brought together in abutting relation, and the shoulders 7 are so positioned that when the levers 4 have their ends which project beyond the inner edge of the section separated, their noses 5 will be disposed in the oppositely positioned notches and interlocked with the shoulders 7 so as to prevent the separation of the rim sections.

Means is provided for actuating the levers 4 and holding them in locked position. This means consists of pivotally connected toggle links 8 which are pivotally connected at 8ª to the ends of the levers 4 which project beyond the inner edge of the rim section 1. As clearly shown in Fig. 4 the toggle links 8 are capable of being swung into longitudinal alinement with each other, the pivot 8ᵇ which connects them together passing dead center, that is, the line between their pivots 8ª, so that said links will not accidentally become moved out of this position. Further inward movement of the links is prevented by the abutment of shoulders 9 formed upon the same. When the links are in alinement with each other the ends of the levers 4 to which they are pivoted are separated to their greatest extent and the noses 5 at the other ends of the levers will be disposed in their innermost positions interlocked with the shoulders of the lugs 6. In order to disengage the noses 5 of the levers from the lugs 6, the links 8 are swung outwardly transversely of the rim sections.

In Fig. 4 of the drawings the rim sections are shown in abutting relation and the levers 4 are shown expanded by means of the toggle links so that their noses 5 are engaged with the shoulders of the lugs 6. In this position the rim sections are locked together, and it is obvious that the pressure of the tire on the rim exerted transversely so as to tend to separate the rim sections will have no effect upon the interlocking means for the same. In Fig. 6 the toggle links 8 are shown in their outwardly swung position so that the levers 4 are out of engagement with the lugs 6. When the parts of the device are in this position the rim sections are separable. In Fig. 7 the rim sections are shown separated and the construction of the parts carried by each of them is clearly illustrated.

In Figs. 1 to 7 of the drawings the rim sections 1 and 2 have ridges at the edges of their inner sides. These ridges are cut away at the portions occupied by the lugs 6 and levers 4 so that these members are mounted flat against the inner sides of the sections. The lugs 6 are secured to the section 2 by means of pivots or other suitable fastening elements.

In Figs. 8, 9, 10 and 11, however, the lug 6 is shown formed integral with the section 2 and the section 1 is recessed as at 10 to receive it. The levers 4 are pivoted to the section 1 in portions of the recess 10. The ends of the levers which project beyond the inner edge of the section 1 and the toggle links 8 connected to these ends are received in a recess 11 arranged in the inner side of the section 2.

When the demountable rim is placed upon the felly F of a wheel such as shown in Figs. 1, 2 and 3 of the drawings, it rests upon the metallic rim R usually disposed upon the felly and has the flange 3 carried by the rim section 1 bearing against the outstruck flange of said rim R. The flange 3 carried by the rim section 2 is engaged by lugs L disposed upon bolts B which extend transversely through the felly F. The lugs L are adjustable upon the bolts B by means of nuts N. The lugs L have portions disposed adjacent the toggle links 8 so that they prevent lateral shifting of the latter in addition to clamping the demountable rim upon the fixed rim and felly.

From the foregoing description, taken in connection with the accompanying drawings, it will be seen that the objects of the invention have been effectively carried out. When the demountable rim is off of the wheel, the tire may be removed from said demountable rim by the hands without the use of tools by first unlocking the coacting locking elements carried by the rim sections and then separating said rim sections. It is also obvious that when the tire is placed upon the demountable rim and inflated the transverse pressure of the tire upon the rim sections cannot in any way affect the coacting locking means and separate said sections. The levers forming the locking members carried by one of the rim sections extending transversely of the latter and the toggle links being disposed adjacent the outer edge of the other section and swinging outwardly to unlocked position are prevented from becoming unlocked by means of adjacent portions of the lugs which clamp the rim upon the felly.

Various changes in form, proportion, and in the minor details of construction may be resorted to without departing from the invention as defined in the claims.

I claim as my invention:

1. A rim comprising two circular abutting sections, coacting locking members carried by said sections, the locking members carried by one section being movable in and out of engagement with those carried by the other section, and means for actuating said movable members and holding them in interlocked position, said means being connected to and carried entirely by said movable members.

2. A rim comprising two circular abutting sections, coacting locking members carried by said sections, the locking members carried by one section being movable in and out of engagement with those carried by the other section, and toggle means for actuating said movable members and holding them in interlocked position.

3. A rim comprising two circular abutting sections, coacting locking members carried by said sections, the locking members carried by one section being pivoted thereto to move in and out of engagement with those carried by the other section, and toggle links connected to said pivoted members for actuating the same and holding them in locked position.

4. A rim comprising two circular abutting sections, coacting locking members carried by said sections, the members carried by one section being pivoted intermediate of their ends thereto and having one of their ends movable in and out of engagement with the members carried by the other section, and toggle links connected to the other ends of said pivoted members for actuating the same and holding them in locked position.

5. A rim comprising two circular abutting sections, locking members carried by one of said sections, locking members carried by the other section and shiftable in and out of locking engagement with the first mentioned locking members, and means for moving the last named locking members in and out of engagement with the first named locking members and holding them in locked position.

6. A rim comprising two circular abutting sections, shouldered members carried by one of said sections, levers pivotally mounted intermediate of their ends to the other section and having one of their ends movable in and out of locking engagement with said members, and toggle links disposed between and pivotally connected to the other ends of said levers for actuating the same and holding them in locked position.

7. A rim comprising two circular abutting sections, spaced levers pivotally mounted intermediate of their ends to one of said sections, said levers extending transversely of the section to which they are pivoted and having one of their ends projecting inwardly from the inner edge of the same, oppositely shouldered lugs carried by the other section and extending inwardly from the inner edge of the same, said lugs being insertible between said levers and engageable by the other ends thereof, and toggle links disposed between and pivotally connected to the first mentioned ends of said levers to actuate the same and to hold their last mentioned ends in locking engagement with said lugs.

8. A rim comprising two circular abutting sections, coacting locking members carried by said sections, the locking members carried by one of said sections being shiftable into and out of engagement with those carried by the other section, means connected to and carried entirely by said shiftable members for operating and holding the latter in interlocked position, said means being shiftable transversely and outwardly with respect to the rim and being adapted for engagement with the rim holding means of a felly.

9. A rim comprising two circular abutting sections, coacting locking members carried by said sections, the locking members carried by one of said sections extending transversely of the same and pivotally mounted thereto so as to move in and out of engagement with the members carried by the other sections, toggle links pivotally connected to said pivoted members for operating the same and holding them in locked position, said toggle links swinging transversely and outwardly with respect to the rim and adapted to be engaged by the rim holding means when the rim is mounted upon a felly.

In testimony whereof I have hereunto set my hand.

HARRY S. WILLIAMS.